United States Patent

[11] 3,550,618

| [72] | Inventor | David A. Roach |
| | | Tulsa, Okla. |
| [21] | Appl. No. | 739,880 |
| [22] | Filed | June 25, 1968 |
| [45] | Patented | Dec. 29, 1970 |
| [73] | Assignee | Mapco Inc. |
| | | Tulsa, Okla. |
| | | a corporation of Delaware |

[54] ANHYDROUS AMMONIA PIPELINE SYSTEM
4 Claims, 3 Drawing Figs.

[52] U.S. Cl........................................................ 137/566,
137/568
[51] Int. Cl....................................................... E03b 5/00
[50] Field of Search.......................................... 137/565,
566, 568, 572, 1, 2, 13, 14, 256, 263

[56] References Cited
UNITED STATES PATENTS
| 2,832,363 | 4/1958 | Wood et al. ................... | 137/1 |
| 3,269,401 | 8/1966 | Scott et al. .................... | 137/566X |

*Primary Examiner*—William R. Cline
*Attorney*—Robillard and Byrne

ABSTRACT: A distribution system for the delivery of liquid-anhydrous ammonia from its production location to its area of use wherein said system includes a series of pumping stations, a series of withdrawal stations and a series of storage facilities for furnishing the capacity to selectively disperse the liquid from any of said storage facilities to any of said withdrawal stations by providing said pumping stations with a bidirectional pumping ability.

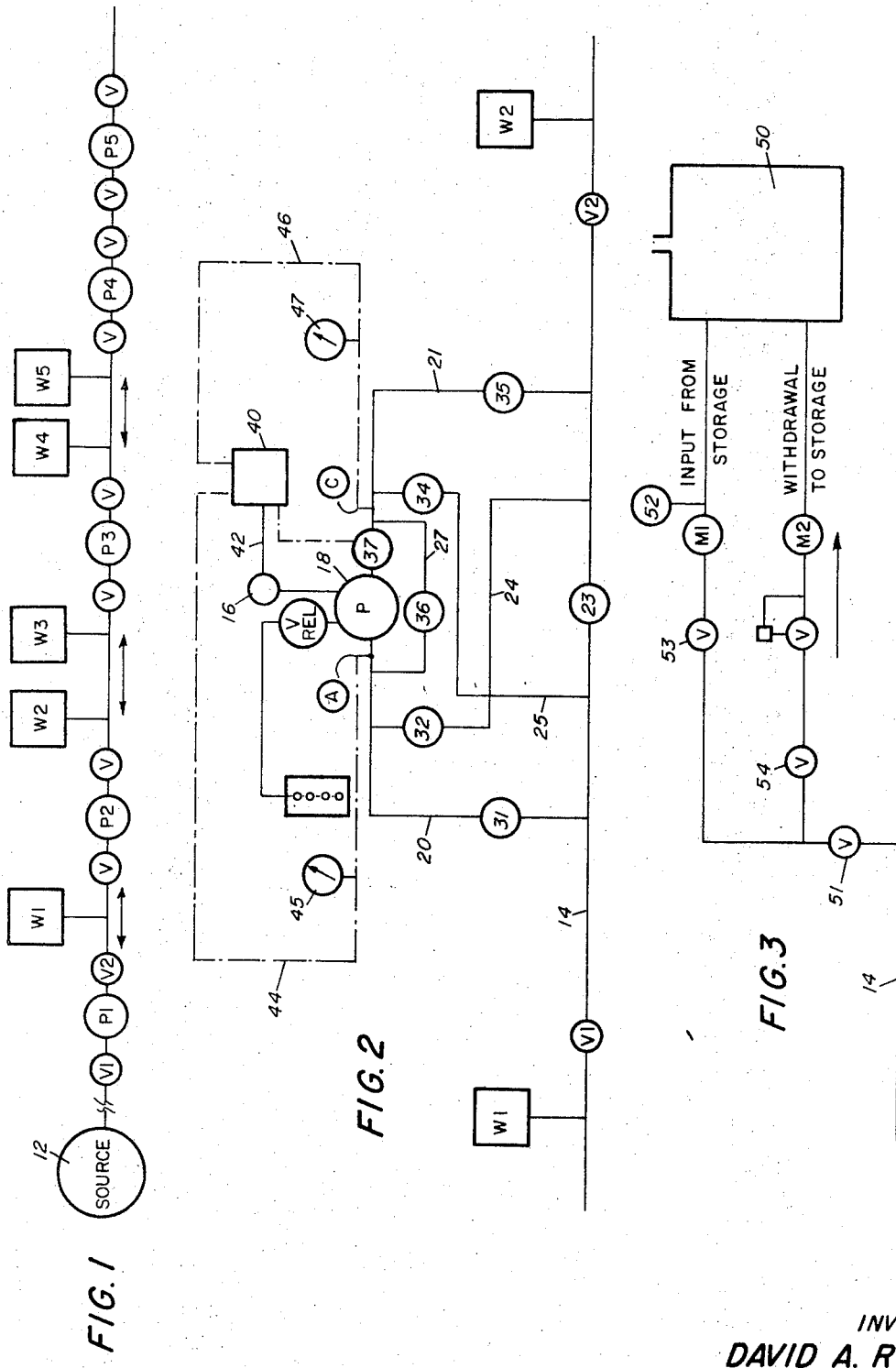

ANHYDROUS AMMONIA PIPELINE SYSTEM

This invention relates generally to means for transporting liquid-anhydrous ammonia over long distances under safe conditions and for ready dispersal to areas of use along the line of transportation.

As a general rule, anhydrous ammonia is most profitably produced in the natural gas areas of the world. The use of anhydrous ammonia has increased manifold over the past several decades as a fertilizer in farm markets. The place of production of the ammonia is normally far removed from the areas of its greatest use and its use has therefore been curtailed to some extent by the necessity of transporting the ammonia by rail and wheeled transportation systems. The use of anhydrous ammonia as a fertilizer is a very seasonal market. Approximately 80 percent of the annual production is applied within a 3 week period. When using wheeled transportation, suitable supplies can reach the area of use during this short period only if a great many vehicles are used at the same time or if large storage areas are constructed throughout the agricultural area involved. A further difficulty with anhydrous ammonia as fertilizer is that rain can prohibit its application for several days during the already very short application season.

An objective of this invention is to provide an underground pipeline system for transporting anhydrous ammonia whereby sufficient amounts of this fertilizer can reach the principal market areas during the limited application season available. When a particular area is rendered unsuitable for the application of fertilizer because of weather conditions, it is desirable to have the capacity to move the ammonia from one storage area to the other. In view thereof, another objective of this invention is to provide a pipeline system wherein the anhydrous ammonia can reenter the system and be pumped effectively in either direction so that each storage facility is available to service other application areas along the length of the pipeline.

A further objective of this invention is to provide an anhydrous ammonia transportation system of the closed pressure type wherein operating pressures are maintained and controlled for maintaining the anhydrous ammonia in a liquid state and at a flowing temperature at all points and to simultaneously permit the receipt and withdrawal at various locations in either direction of flow for meeting the heavy seasonal demands.

A further objective of this invention is to provide means whereby a leak occuring in either the downstream or the upstream side of a pumping station will be contained by valves until pressure is restored.

A still further objective of this invention is to provide water tanks at each pumping station whereby any gaseous ammonia vapor can be readily absorbed as a safety measure.

These and other objects of the invention will become more apparent to those skilled in the art by reference to the following detailed description when viewed in light of the accompanying drawings wherein:

FIG. 1 is a schematic of a pipeline system;

FIG. 2 is a more complete schematic of an individual storage and withdrawal station of FIG. 1; and FIG. 3 is a diagrammatic-schematic of the fluid control system of a pumping station of FIG. 1.

Referring now to the drawings wherein like numerals indicate like elements, the numeral 10 generally indicates the pipeline system of this invention. An anhydrous ammonia source is indicated by the numeral 12 and the pipeline itself is generally indicated by the numeral 14. Disposed along the length of the pipeline 14 are a series of pumping stations P1, P2, P3, P4, and P5. Disposed between the pumping stations are storage and withdrawal stations W1, W2, W3, W4, and W5. As you can by the diagrammatic of FIG. 1, one or more withdrawal stations, for instance, W4 and W5, can be disposed intermediate the pumping stations. This will depend on the fertilizer demand of localities involved.

On either side of each pumping station are valves V1 and V2. As indicated in FIG. 1, there is such a valve disposed in the downstream and upstream sides of each pumping station. As indicated by the arrows, each pumping station is reversible.

At each pumping station there is a source of power such as an engine, motor, or turbine indicated by the numeral 16. The source of power drives a pump 18 designed to handle liquid anhydrous ammonia. The direction of flow can be reversed at each station by valve manipulations. Each pumping station is equipped with a conduit system, valving and controls for maintaining proper pressures at liquid flow temperatures to move ammonia in either direction.

A first conduit 20 communicates one side of pump 18 to main line 14 and a second conduit 21 communicates the other (normally the downstream) side of the pump to the main line. A valve 23 is disposed along the main line 14 intermediate the points of attachment of conduits 20 and 21. A conduit 24 communicates the upstream side of pump 18 to the length of the main line between valve 23 and conduit 21 and a conduit 25 communicates the downstream side of pump 18 to the length of the main line between valve 23 and conduit 20. A bypass conduit 27 connects the upstream and downstream sides of the pump.

Fluid control valves 31, 35, 32 and 34 are respectively disposed across the conduits 20, 21, 24 and 25. A safety valve 36 is disposed in conduit 27.

The source of power 16 is controlled by a conventional control unit 40. The unit is operably connected to a source of power 16 by a throttle modulating control generally designated by the numeral 42 if an engine or turbine, or to a control valve 37, if the source of power is a motor. The control unit 40 is of a type in which a desired pressure can be selected as the set point. A pilot line 44 senses the suction pressure as indicated by gauge 45 for the control unit and the discharge pressure is sensed through pilot line 46 and as shown by gauge 47.

A suction pressure at point A is established reflecting the minimum pressure above the vapor pressure of the liquid anhydrous ammonia at its flowing temperature and above the required net positive suction head of pump 18. This pressure is set into the control unit 40. As long as the station suction pressure is above this value, the source of power, if of variable speed, operates at maximum speed. If the source of power is a motor, the control valve 37 is wide open. When the suction pressure falls to the set point value, the suction controller senses the pressure level and acts to reduce source of power speed. This reduces pump speed and the volume pumped. If the source of power is an electric motor, the control valve 37 partially closes, reducing the volume pumped. Either action will cause suction pressure at point A to rise. The control unit therefore acts to continuously maintain a suction pressure A equal to or above the suction pressure set point.

A suction pressure switch also senses suction pressure and it is set to shut the station down if the suction control unit should fail to control the pressure. This switch is set above the liquid vapor pressure but below the suction pressure set point.

Station discharge pressure is controlled similarly to the suction pressure. The maximum allowable pressure consistent with the design pressure rating of the pipeline and pipeline facilities is used as a guide for establishing the discharge pressure set point. The set point will be safely below this value to permit the discharge pressure switch to be set at the design pressure rating.

The discharge pressure set point is set in the same manner as the suction pressure set point. When the discharge pressure is below the set point, the control unit permits the source of power if of variable speed to operate at maximum speed or as controlled by the suction controller. If the source of power is a motor, the control valve 37 is wide open. As the discharge pressure reaches the set point, the control unit acts to reduce the source of power speed, which reduces the pump speed and volume pumped, in turn reducing the discharge pressure at point C. If the source of power is an electric motor, the control valve 37 partially closes, reducing the volume pumped. Either action will cause the discharge pressure to reduce. The discharge pressure controller acts continuously to limit the maximum pressure to the set point level. Should the pressure exceed the set point, the discharge pressure switch will shut the station down.

Successive stations on the system act in this manner to keep a pressure in the system to keep ammonia in a liquid state, control the rate of flow at the desired level and to avoid overpressure of the system.

In pumping in the direction W1 to W2, valves 31 and 35 are opened and valves 32, 34 and 36 are closed. When it is desired to pump in the direction toward W1, valves 32 and 34 are opened and valves 31, 35 and 36 are closed.

Operation at the pumping stations is, of course, closely related to and determined by the activities taking place in the storage and withdrawal stations. As mentioned previously the anhydrous ammonia can be returned from its storage facility to the main line and, of course, can withdraw the ammonia from the main line.

At each input or withdrawal point there is a storage area indicated by the numeral 50. During withdrawal of ammonia from the pipeline to the storage area, valves 51 and 54 are open. A pressure control valve 55 controls the flow rate and pressure through a meter M2 to thereby regulate the pressure at point 50 at the level necessary to maintain the ammonia as a liquid. To return the ammonia to the pipeline, valve 54 is closed and the valve 53 is opened. When it is desired to discharge, the pressure at point 52 which represents the discharge pressure of a pump in the withdrawal station must be kept high enough to cause the ammonia to enter the main line at the desired rate through the meter M1. The output from the storage area at point 50 is controlled by conventional valving not considered as a part of this invention.

In a general manner, while there has been disclosed effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

I claim:

1. A pipe line system for transporting liquid-anhydrous ammonia over long distances from its source of manufacture to the locale of application comprising, a pipe line extending from said source to said locale, a plurality of reversible pumping stations spaced along the length of and in communication with said pipeline, means for maintaining said anhydrous ammonia as a liquid at flowing temperatures and pressures, a plurality of withdrawal installations spaced along and in communication with said pipeline intermediate said pumping stations, a storage facility at each of said withdrawal installations, valving means in each of said withdrawal installations for selectively withdrawing said anhydrous ammonia from said pipeline and returning same to said pipeline while regulating its temperature and pressure to maintain it at a flowable liquid, and means at each of said pumping stations for pumping the anhydrous ammonia toward each of said installations.

2. The system of claim 1 wherein said pumping installations include a pump driven by a source of power, control apparatus for regulating the source of power in response to system pressures, and means for sensing said system pressures.

3. The system of claim 2 wherein said valving means includes a plurality of bypass conduits with valve units therein.

4. the system of claim 1 wherein water tanks are provided at said pumping stations, and conduit means bleed excess vapors to said tanks for absorption thereof.